United States Patent
Wei et al.

(10) Patent No.: US 12,471,007 B2
(45) Date of Patent: Nov. 11, 2025

(54) COMMUNICATIONS DEVICES, INFRASTRUCTURE EQUIPMENT AND METHODS

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 490 days.

(21) Appl. No.: 17/918,138

(22) PCT Filed: Mar. 15, 2021

(86) PCT No.: PCT/EP2021/056532
§ 371 (c)(1),
(2) Date: Oct. 11, 2022

(87) PCT Pub. No.: WO2021/223928
PCT Pub. Date: Nov. 11, 2021

(65) Prior Publication Data
US 2023/0133355 A1    May 4, 2023

(30) Foreign Application Priority Data
May 7, 2020    (EP) .................................... 20173581

(51) Int. Cl.
*H04W 48/12*    (2009.01)
*H04W 48/02*    (2009.01)
*H04W 48/16*    (2009.01)

(52) U.S. Cl.
CPC ........... *H04W 48/12* (2013.01); *H04W 48/02* (2013.01); *H04W 48/16* (2013.01)

(58) Field of Classification Search
CPC ..... H04W 48/12; H04W 48/02; H04W 48/16; H04W 48/18
See application file for complete search history.

(56) References Cited

U.S. PATENT DOCUMENTS 11,464,052 B2 * 10/2022 Matsuda ........... H04W 74/0891
2015/0319701 A1    11/2015 Ng et al.
(Continued)

FOREIGN PATENT DOCUMENTS

| EP | 3599787 A1 | 1/2020 |
| JP | 2011519497 A | 7/2011 |

(Continued)

OTHER PUBLICATIONS

International Search Report and Written Opinion mailed on May 26, 2021, received for PCT Application PCT/EP2021/056532, filed on Mar. 15, 2021, 11 pages.

(Continued)

*Primary Examiner* — Diane D Mizrahi
(74) *Attorney, Agent, or Firm* — XSENSUS LLP (57) ABSTRACT

A communications device is provided. The communications device comprises transceiver circuitry configured to transmit signals to and/or to receive signals from a first cell of a wireless communications network, and controller circuitry. The controller circuitry is configured in combination with the transceiver circuitry to determine that the communications device is within a coverage area of a cell of a wireless communications network, to receive a downlink signal from the cell of the wireless communications network, the downlink signal indicating whether or not the communications device can connect to the cell in order to transmit signals to and/or receive signals from the wireless communications network, and to detect, based on the downlink signal, (Continued)

whether the wireless communications network is an on-demand network and/or a temporary network.

20 Claims, 6 Drawing Sheets

(56) References Cited

U.S. PATENT DOCUMENTS

| | | |
|---|---|---|
| 2019/0349701 A1 | 11/2019 | Mehta |
| 2019/0349837 A1 | 11/2019 | Shih et al. |
| 2019/0357123 A1 | 11/2019 | Jha |
| 2019/0357125 A1 | 11/2019 | Mildh et al. |

FOREIGN PATENT DOCUMENTS

| | | |
|---|---|---|
| JP | 2019523575 A | 8/2019 |
| WO | WO-2010032477 A1 | 3/2010 |
| WO | WO-2019096946 A1 | 5/2019 |
| WO | 2019/194597 A1 | 10/2019 |

OTHER PUBLICATIONS

Qualcomm, Inc., "Network as a Service—SA1 Rel-18 Proposal—Motivations & Objectives", 2018, 6 pages.

Holma et al., "LTE for UMTS OFDMA and SC-FDMA Based Radio Access", John Wiley & Sons, 2009, 232 pages.

Qualcomm Inc., "Revised WID on NR-based Access to Unlicensed Spectrum", 3GPP TSG RAN Meeting #84, RP-191575, Jun. 3-6, 2019, 8 pages.

Nokia et al., "Revised WID: Support of NR Industrial Internet of Things (IoT)", 3GPP TSG RAN Meeting #85, RP-192324, Sep. 16-20, 2019, 6 pages.

ZTE Corporation, "Revised work item proposal: 2-step RACH for NR", 3GPP TSG RAN Meeting #85, RP-192330, Sep. 16-20, 2019, 4 pages.

Sony, "Cell selection/reselection with NPN cells", 3GPP TSG RAN WG2 Meeting# 107bis, R2-1913363, Oct. 14-18, 2019, 3 pages.

\* cited by examiner

ND METHODS

CROSS-REFERENCE TO RELATED APPLICATIONS

The present application is based on PCT filing PCT/EP2021/056532, filed Mar. 15, 2021, which claims priority to EP 20173581.8, filed May 7, 2020, the entire contents of each are incorporated herein by reference.

BACKGROUND

Field of Disclosure

The present disclosure relates to communications devices which are configured to transmit data to and receive data from wireless communications networks and to infrastructure equipment forming part of wireless communications networks, where the wireless communications networks include ad-hoc networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

More recently developed wireless communications networks are expected to routinely and efficiently support communications with a wider range of devices associated with a wider range of data traffic profiles and types than current systems are optimised to support. For example, such wireless communications networks are expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for such wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles.

For example, such applications may include those where the 5G (or future) network is deployed on an ad-hoc basis to provide a temporary or on-demand network, within specific geographical or temporal boundaries.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide communications devices comprising transceiver circuitry configured to transmit signals to and/or to receive signals from a first cell of a wireless communications network, and controller circuitry. The controller circuitry is configured in combination with the transceiver circuitry to determine that the communications device is within a coverage area of a cell of a wireless communications network, to receive a downlink signal from the cell of the wireless communications network, the downlink signal indicating whether or not the communications device can connect to the cell in order to transmit signals to and/or receive signals from the wireless communications network, and to detect, based on the downlink signal, whether the wireless communications network is an on-demand network and/or a temporary network.

Embodiments of the present technique, which in addition to communications devices also relate to infrastructure equipment, methods of operating communications devices and infrastructure equipment, and circuitry for communications devices and infrastructure equipment, provide solutions that allow for the utilisation of ad-hoc networks, and specifically for on-demand or temporary networks.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
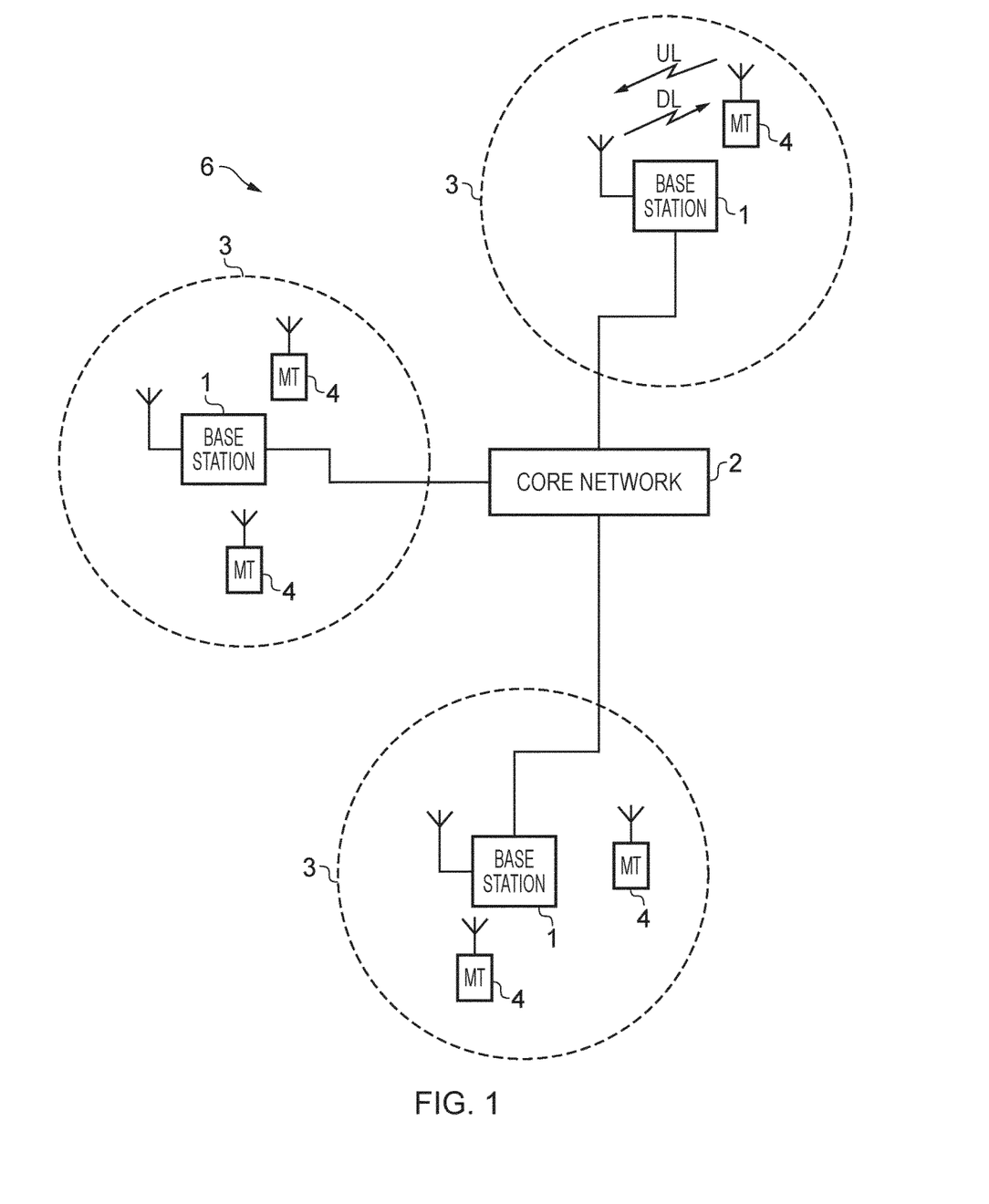
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

3GPP has completed the basic version of 5G in Rel-15, known as the New Radio Access Technology (NR). In addition, enhancements have been made in Rel-16, incorporating new features such as the 2-step RACH procedure [2], Industrial Internet of Things (IIoT) [3] and NR-based Access to Unlicensed Spectrum (NR-U) [4]. Further enhancements have been agreed for Rel-17, such as small data transmissions while the UE is in the RRC_INACTIVE state.

Figure 2:
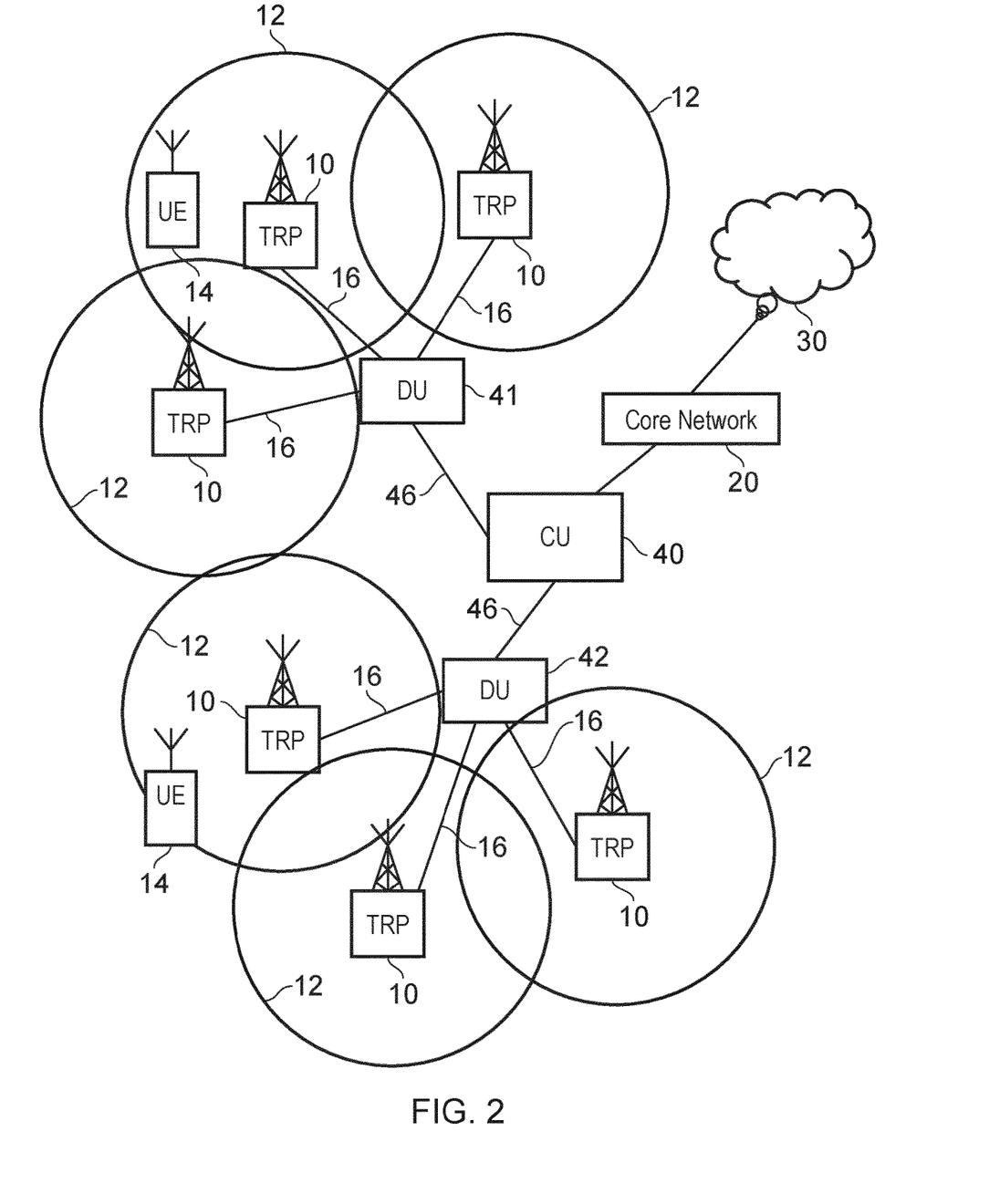
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 25.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12. It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
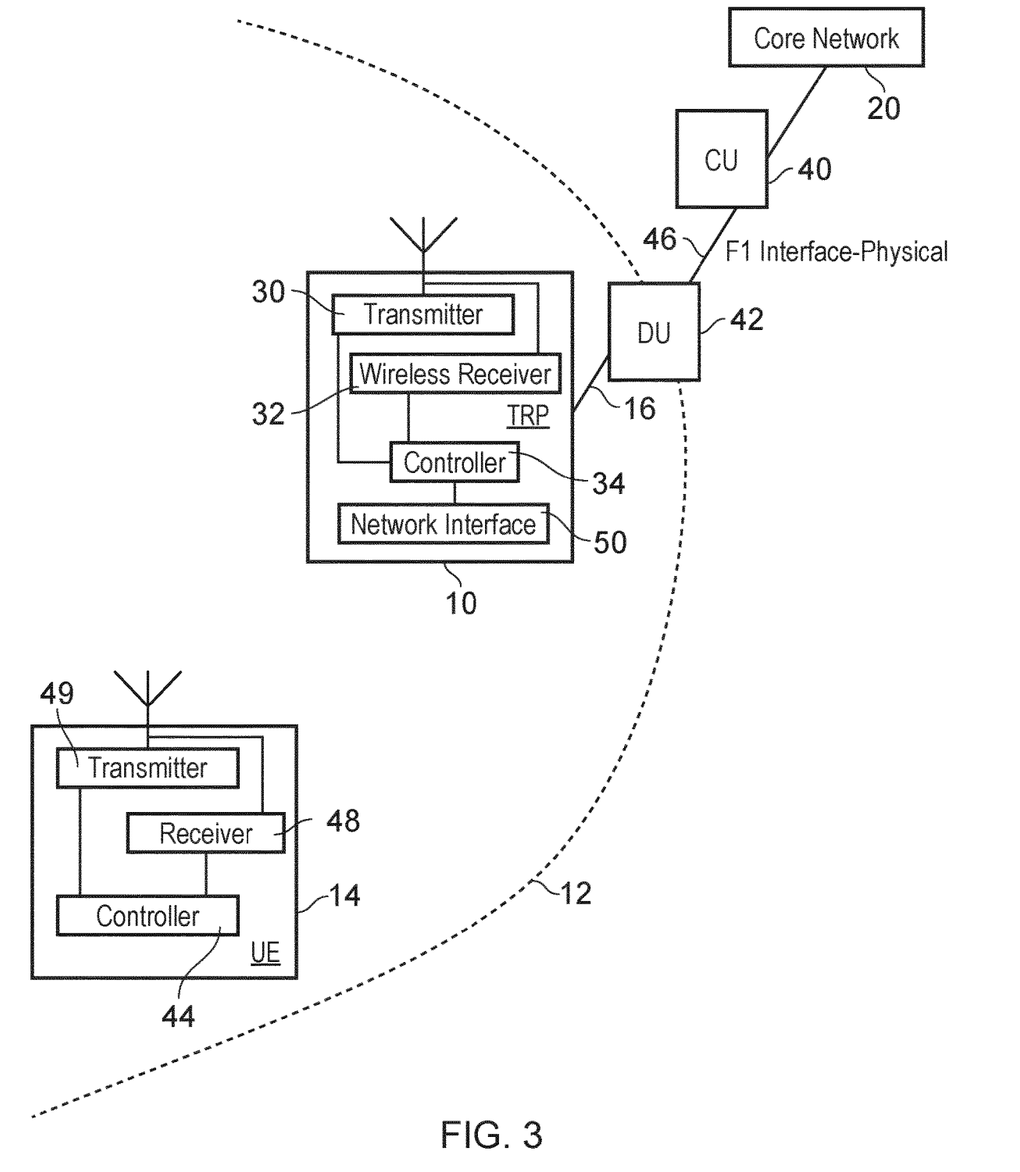
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Network as a Service (NaaS)

Network as a Service (NaaS) describes services for network transport connectivity, and may refer to any of a number of different types of network, such as an on-demand network, a temporary network, or a virtual private network (VPN). The justification, motivation, use cases, and requirements for NaaS are broadly covered in [5], and are described below.

In some locations, a 5G network can be available or deployed in an ad-hoc manner (e.g. for on-demand or temporary events), providing coverage and connectivity to local users, for example:

Sport venues or stadiums;
School/university or enterprise campus;
Entertainment/gaming fairs; or
Theatres, shopping malls, etc.

The 5G network operator may allow/offer users to access on-demand services from a $3^{rd}$ party (e.g. a content provider or mobile operator), as additional revenue stream(s). Examples here, with reference to the above locations in which an ad-hoc network may be deployed, include:

Match coverage with replay and statistics at a sport venue (e.g. NFL or Premier League content provider);
Video streaming on-campus for events happening off-site;
Games, previews or demos at a large gaming event/fair; or
Trailers/news at a movie theatre, or ads or special promotions at a shopping mall.

Providing these contents or on-demand service over the 5G "serving" network may require specific and dynamic QoS support, network/UE configuration and policies/provisioning. For example:
The serving 5G network should support certain UEs and services with specific QoS/policy requirements;
The serving 5G network should configure UEs and network in order to set up a PDU session correctly;
The serving 5G network should provide ad hoc subscription/credentials to users, and available services; and
The above configuration/functionalities could be dynamic, e.g. on demand and/or temporary.

The on-demand or temporary service may be provided by a Public Land Mobile Network (PLMN), Non-Public Network (NPN) or other content service provider. The network may deploy a dedicated slice for supporting this service, and this may motivate a mobile operator to charge specifically for the use of this service. As described below, embodiments of the present technique propose that the PLMN, NPN or other content service provider for the ad-hoc network to be separate to those used to operate the serving 5G networks and run by different mobile network operators. Therefore, it is possible for users/subscribers/UEs of different operators to access the on-demand/temporary networks and services.

The 5G serving network or the on-demand services may cover specific locations, and here the coverage area size may be small or large.

General mechanisms, for example those related to roaming, QoS, slicing, or charging, could be enhanced. Other specific configurations, for a network to provide access to services of different operators, may have constraints, for example:
Radio Access Network (RAN)/Core Network (CN) sharing;
More tight/permanent integration and configuration of resources across RAN and Core Network(s);
Non-Public Networks (NPNs);
Current functionalities do not offer enough granularity (e.g. per-PLMN services, in case of Standalone NPN (SNPN)); and
Some requirements (e.g. introduced by Audio-Visual Service Production (AVPROD) in Rel-17) may address different/specific use cases.

The objectives of the study as described in [5] include:
The identification of use cases and requirements to support a serving 5G network to provide users access to services from a $3^{rd}$ party (e.g. a content provider or mobile operator), including:
Mechanisms for UEs to discover specific $3^{rd}$ party services available over the serving 5G network;
Network configuration and signalling means, to establish access to a specific $3^{rd}$ party service over the serving 5G network, including:
Negotiation of service/traffic requirements, e.g. QoS, network slicing, charging etc. and
Mechanisms to provision and obtain specific UE credentials and authorization;
If $3^{rd}$ party is a mobile operator (PLMN or NPN):
Control mechanisms and policies for users of the mobile operator to access specific services over the serving 5G network; and
Gap analysis of potential new requirements and existing requirements & functionalities supported by 3GPP.

Services and functionalities could be dynamic, e.g. on-demand and/or temporary as has been described above, and may cover specific location(s), of be different area size(s).

Figure 4:
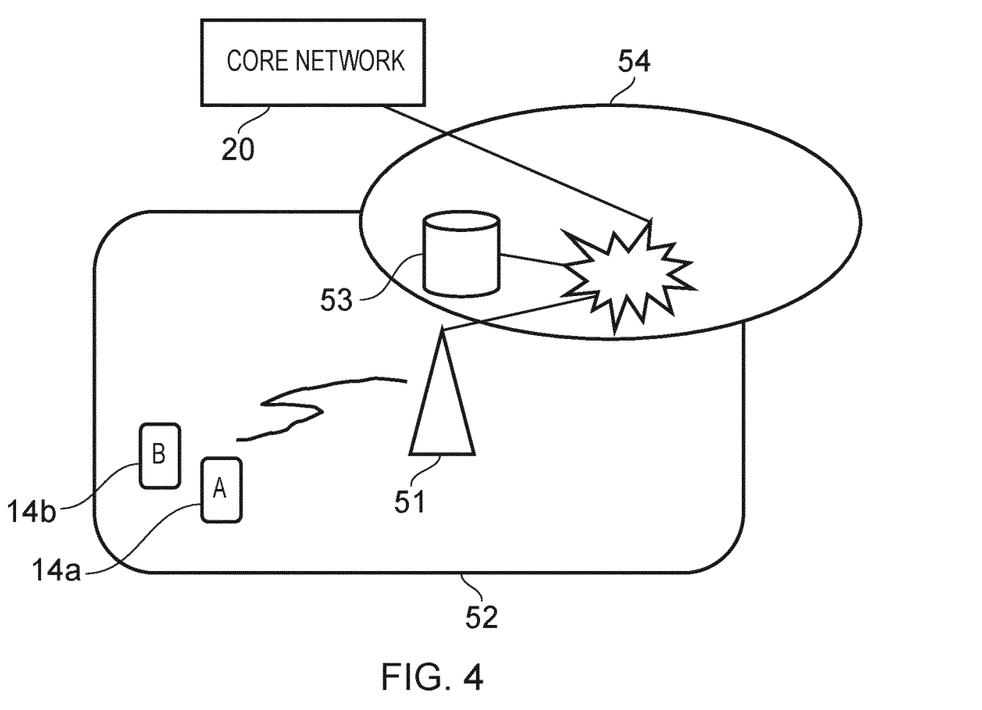
FIG. 4 illustrates an example of a Network as a Service (NaaS) deployment in a stadium in accordance with certain embodiments of the present disclosure.

In a stadium scenario, a content producer or a mobile operator may provide special contents via a temporary or on-demand network only for those inside the stadium and agreed to use this service. Such contents/services may only be provided at predefined times, for example during a sports match at the stadium. FIG. 4 shows an example of such a deployment in a stadium. As shown in FIG. 4, a base station 51 or cell site is deployed in a stadium 52. However, those skilled in the art would appreciate that the stadium 52 could be covered by a macro cell as well. The cell is connected to the core network 20 (e.g. 5GC) and the 5GC 20 is connected to the content server 53, which may physically reside in the stadium 52 and using a dedicated slice 54. So, a dedicated slice 54 for this service may span across parts of the core network 20, content server 53, gNB 51, and transport network. The above mentioned different functions may be virtualized, and therefore may physically reside at different places to those shown. FIG. 4 shows two UEs; UE A 14a and UE B 14b. In this example, the gNB 51 cell broadcasts a PLMN for UE A 14a only, as UE B 14b is attached to a different network operator than that which operates the gNB 51. UE B 14b will not find its home PLMN in the broadcasted PLMN list from this cell. So, in normal circumstances, this cell is not a suitable cell for UE B 14b, but, as mentioned above and in [5], UE B 14b should be able to receive this special service in the stadium 52. However, the terms of usage of this network may not always be acceptable to the user of UE B 14b.

Embodiments of the present technique proposes solutions to deal with one of the challenges introduced by the concept of Network as a Service (NaaS). That is, how should on-demand networks and temporary networks be treated differently between. It is foreseen that an on-demand network may be a network already and constantly in a fixed position, but in a dormant state, and requires a trigger to wake it up. On the other hand, a temporary network may only exist for a pre-defined time and/or for a special event/service, and therefore may need to notify potential users of its presence. These characteristics may lead to different UE and network configurations or behaviours when exploiting deployment of ad-hoc networks. Those skilled in the art would appreciate however, from a physical deployment point of view, these two types of ad-hoc networks don't necessarily have to have distinct infrastructures.

Supporting Network as a Service (NaaS)

Figure 5:
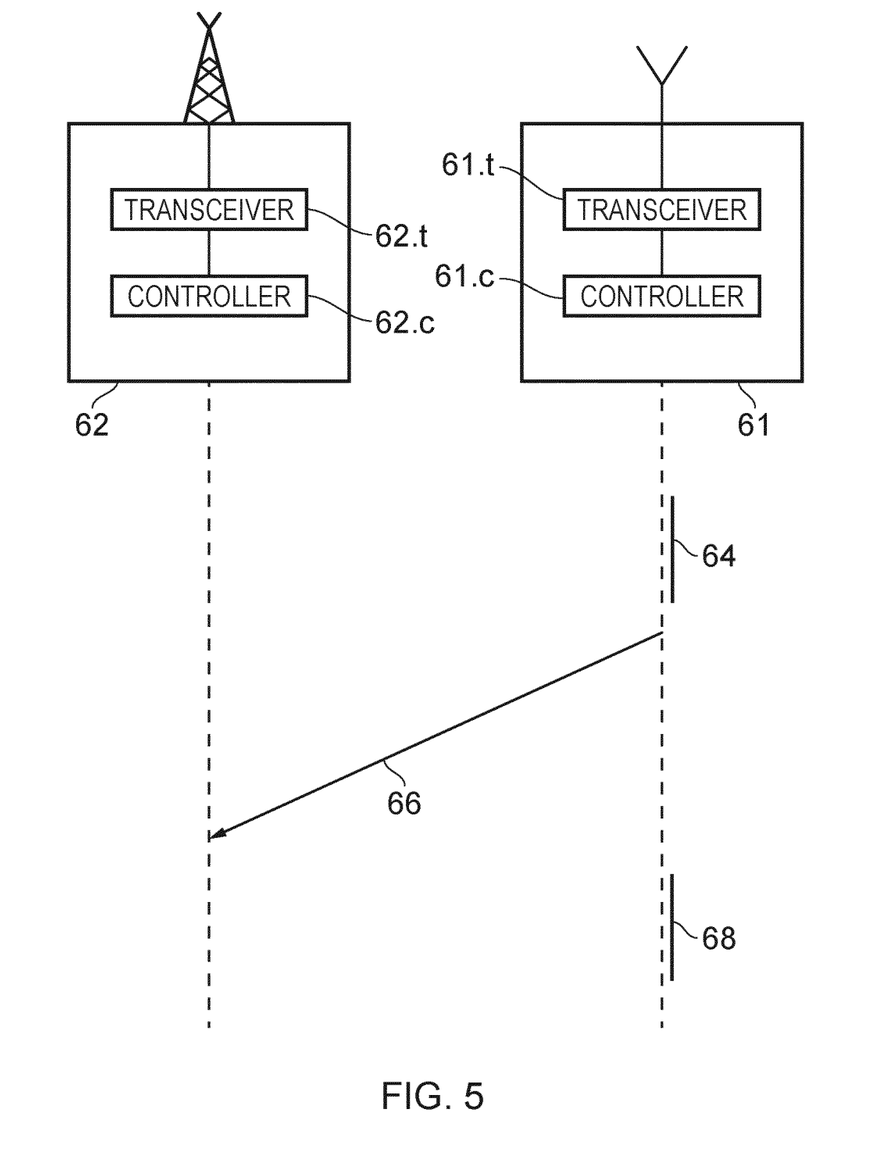
FIG. 5 is a part schematic representation, part message flow diagram of communications between a communications device and a wireless communications network in accordance with embodiments of the present technique.
Figure 6:
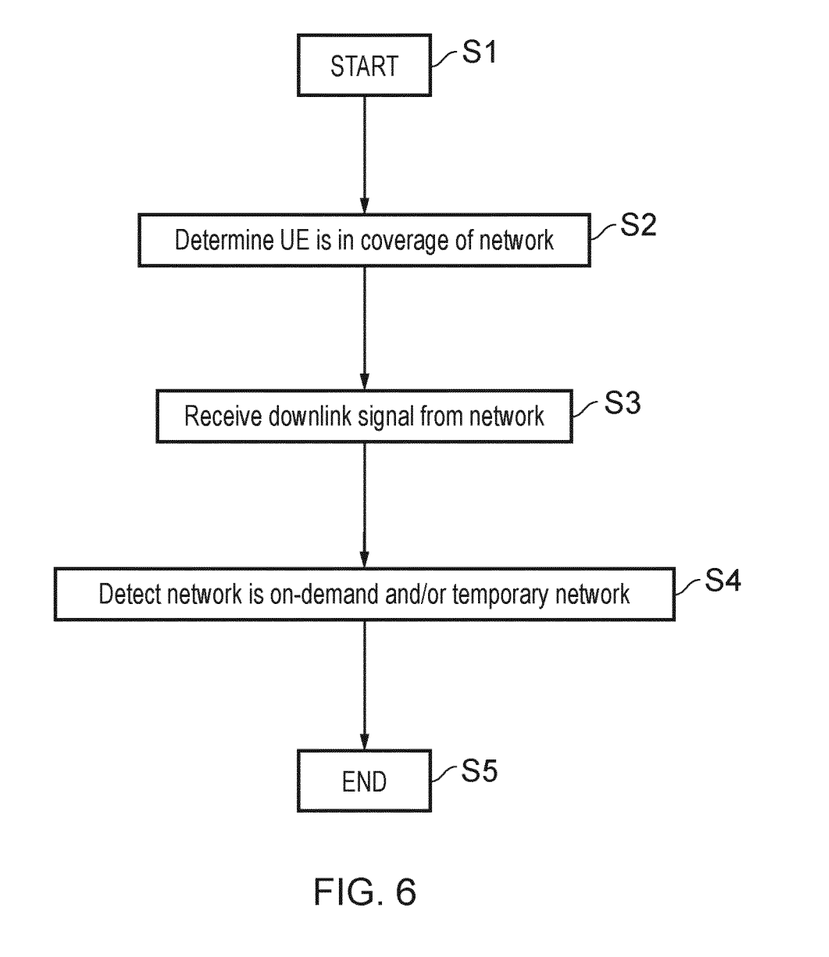
FIG. 6 shows a flow diagram illustrating a method of operating a communications device in accordance with embodiments of the present technique.

FIG. 5 provides a part schematic representation, part message flow diagram of communications between a communications device or UE 61 and a wireless communications network in accordance with embodiments of the present technique. The wireless communications network may include an infrastructure equipment 62 which provides a cell having a coverage area within in one of which the communications device 61 may be located, or may enter in and out of, either as the communications device 61 moves, the wireless communications network—which may only be provided in accordance with a pre-defined time schedule—is available to the communications device 61, or a combination of both. The communications device 61 comprises a transceiver (or transceiver circuitry) 61.t configured to transmit signals to or receive signals from the wireless communications network (for example, to the infrastructure equipment 62 via a wireless access interface provided by the wireless communications network), or indeed from other wireless communications networks, and a controller (or controller circuitry) 61.*c* configured to control the transceiver circuitry 61.*t* to transmit or to receive the signals. As can be seen in FIG. 6, the infrastructure equipment 62 may also comprise a transceiver (or transceiver circuitry) 62.*t*, which may configured to transmit signals to or receive signals from the communications device 61 via the wireless access interface, and a controller (or controller circuitry) 62.*c*, which may be configured to control the transceiver circuitry 62.*t*, to transmit or to receive the signals. Each of the controllers 61.*c*, 62.*c* may be, for example, a microprocessor, a CPU, or a dedicated chipset, etc.

The wireless communications network may be one of a public land mobile network, PLMN, and a non-public network, NPN, which is configured to provide on-demand or temporary services to the communications device regardless of which mobile network operator provides wireless communications services to the communications device The controller circuitry 61.*c* of the communications device 61 is configured in combination with the transceiver circuitry 61.*t* of the communications device 61 to determine 64 that the communications device 61 is within a coverage area of the cell (controlled by the infrastructure equipment 62) of the wireless communications network, to receive 66 a downlink signal from the cell of the wireless communications network, the downlink signal 66 indicating whether or not the communications device 61 can connect to the cell in order to transmit signals to and/or receive signals from the wireless communications network, and to detect 68, based on the downlink signal 66, whether or not the wireless communications network is an on-demand network and/or a temporary network.

Essentially, embodiments of the present technique propose ways of how Network as a Service (NaaS) can be supported, with respect to at least each of on-demand networks and temporary networks. Embodiments of the present technique define signalling and configurations to support such on-demand and temporary networks, by taking the characteristics of these two types of network into account.

In order to distinguish between on-demand networks and temporary networks (if necessary), a special network identity e.g. NPN or PLMN ID may be used, and if so, this should be pre-allocated and configured to the UE. In other words, the communications device is configured to detect whether or not the wireless communications network is one of an on-demand network and a temporary network based on a network identifier included within the downlink signal, wherein the network identifier associated with each of an on-demand network and a temporary network is predefined and known to the communications device.

The downlink signal 66 as described with respect to FIG. 5 may indicate whether or not the communications device can connect to the cell in order to transmit signals to and/or receive signals from the wireless communications network based at least in part on a type of the communications device (e.g. the UE is an unmanned aerial vehicle (UAV) or drone) and/or on a specification in accordance with which the communications device operates (e.g. the UE is not a legacy UE).

On-Demand Networks

The use cases for an on-demand network could be, for example:

To provide services to certain type of UEs, e.g. UAVs. There is no need to operate the services for UAVs if there is no UAV at all within the on-demand network's coverage. Once a UAV enters its coverage, the network should provide corresponding services after detecting it; or To provide services only when users enter the coverage or would like to initiate these services; for example, during gaming, at a teleconference, during a virtual tour, during human brain-computer interface communication, etc.

In order to support the on-demand network, additional system information, signalling and/or procedures are introduced by embodiments of the present technique.

In some arrangements of embodiments of the present technique, an indicator is included in the MIB to indicate it is an on-demand network. In other words, the downlink signal is a Master Information Block, MIB, comprising system information relating to the wireless communications network, the MIB comprising an indicator which indicates that the wireless communications network is an on-demand network. With this indicator in the MIB, those conventional UEs/services can ignore it, whereas for those special type of UEs/services (e.g. UAVs), a signal should be sent afterwards to check whether this cell can provide the particularly service(s) they are looking for. Additionally, for those UEs which are interested in on-demand networks, there will not be a requirement to read other SIBs or send any other signalling, only to find that the network does not support on-demand services at all.

In order to bar legacy UEs, in some arrangements of embodiments of the present technique, the cellBarred Information Element (IE) may be set as "barred". However, new type of UEs will read the newly defined IE in MIB (e.g. using the spare bit in Rel-15 MIB) to check whether on-demand networks/services are supported or not. In other words, the MIB comprises an indicator of whether or not access to the cell is barred to communications devices which are unable to receive services from on-demand networks or temporary networks.

In some arrangements of embodiments of the present technique, an on-demand SIB including the related information will be broadcasted on-demand, and SIB1 will indicate its scheduling information. In other words, the communications device is configured to transmit an uplink signal to the cell of the wireless communications network, the uplink signal comprising a request that the wireless communications network provide on-demand services to the communications device, wherein the downlink signal is a System Information Block, SIB, transmitted by the cell of the wireless communications network in response to the uplink signal and comprising system information relating to the wireless communications network, the SIB comprising information indicating that the wireless communications network is an on-demand network This on-demand SIB may include information relating to supported services, and supported UE types, and may be treated as any on-demand SIB s in Rel-15. In other words, the SIB comprises an indication of one or more services supported by the cell of the wireless communications network and/or an indication of one or more types of communications devices supported by the cell of the communications network.

Interested UEs can send a SIB request via RACH to trigger the broadcast of this specific SIB. In other words, the uplink signal forms part of a random access, RACH, procedure initiated by the communications device.

As another option, a reserved preamble can be used to indicate to the network that the SI request is for an on-demand network SIB. In other words, the uplink signal is a reserved preamble, the reserved preamble being associated with a request for the on-demand services. In addition, it is possible for a UE in an RRC_CONNECTED state already to request on-demand services in dedicated manner/message (e.g. DedicatedSIBRequest message). In other words, the uplink signal is a dedicated signal for requesting the on-demand services, and wherein the uplink signal is transmitted by the communications device while the communications device is in a Radio Resource Control, RRC, connected state with the cell of the wireless communications network.

In some cases, the UE may be in an RRC_CONNECTED state in the same cell as that which provides the on-demand services using a dedicated network slice—i.e. a separate logical network to the logical network with which the UE is in the RRC_CONNECTED state. In such a case, the UE first needs to access the SIB to retrieve the service specific information that can be reached from the cell. Once the UE has triggered the broadcast of the SIB through the SI request and determines the availability of the service which the network may provide using a dedicated slice that is used to provide the on-demand services, it can connect to that logical network and receive the on-demand services from the cell. In other words, the SIB comprises an indication of the availability (or presence) of the on-demand service and/or a plurality of network slice identifiers each identifying a different network slice of the cell of the wireless communications network, and wherein the communications device is in the RRC connected state with the cell of the wireless communications network through a different one of the network slices to a network slice used by the cell of the wireless communications network for providing the on-demand services.

The SIB request is also a trigger to initiate the on-demand network, and more specific configurations relating to the on-demand network may be sent to the UE after the connection has been successfully established. From the network's point of view, before it initiates the service, it needs to check the resource availability and service availability. In order to bar legacy UEs, the IE cellReservedForOtherUse could be set to barred and the corresponding PLMN list (e.g. the on-demand network belongs to) should be added as well. In other words, the SIB comprises an indicator of whether or not access to the cell is barred to communications devices which are unable to receive services from on-demand networks or temporary networks.

In some arrangements of embodiments of the present technique, a request can be included in the RRC connection setup message with a specific establishment cause. In other words, the communications device is configured to transmit an uplink signal to the cell of the wireless communications network, the uplink signal comprising a request that the wireless communications network provide on-demand services to the communications device, wherein the uplink signal is an RRC connection request message.

Here, the network can then send an RRC setup reject message if it doesn't support the on-demand network or can send a RRC setup message with additional information; e.g. what services/UE types it supports. In other words, the communications device may be configured to receive, in response to transmitting the uplink signal, an RRC setup reject message indicating that the wireless communications network is not an on-demand network and so cannot provide the on-demand services to the communications device, or alternatively, the communications device may be configured to receive, in response to transmitting the uplink signal, an RRC setup message indicating that the wireless communications network is an on-demand network and so can provide the on-demand services to the communications device.

In some arrangements of embodiments of the present technique, for connected UEs, dedicated RRC signalling can be used to request the on-demand network configurations. In other words, the communications device is configured to transmit an uplink signal to the cell of the wireless communications network, the uplink signal comprising a request that the wireless communications network provide on-demand services to the communications device, wherein the uplink signal is a dedicated signal for requesting the on-demand services, and wherein the uplink signal is transmitted by the communications device while the communications device is in a Radio Resource Control, RRC, connected state with the wireless communications network. Here, as a reply from the network, further on-demand network specific configurations in addition to the supported services/UE types, such as specific bandwidth parts (BWP), configured grants, scheduling request (SR) configurations, etc. may be included.

Temporary Networks

The use cases for a temporary network could be, for example:

To provide services in order to support a special event which usually has a pre-defined schedule e.g. a sport events, a musical or theatrical performance, shopping mall discount information, etc.; or To provide emergency services e.g. during an earthquake, in a field hospital, etc.

In order to support the temporary network, additional system information, signalling and/or procedures are introduced by embodiments of the present technique.

In some arrangements of embodiments of the present technique, an on-demand SIB including the related network/service information will be broadcasted on-demand and SIB1 will indicate its scheduling information. In other words, the communications device is configured to transmit an uplink signal to the cell of the wireless communications network, the uplink signal comprising a request that the wireless communications network provide temporary services to the communications device, wherein the downlink signal is a System Information Block, SIB, transmitted by the cell of the wireless communications network in response to the uplink signal and comprising system information relating to the wireless communications network, the SIB comprising information indicating that the wireless communications network is a temporary network.

This on-demand SIB may include information relating to supported services and corresponding schedules for these services, supported UE types, and minimum link quality requirements (e.g. a Reference Signal Received Power (RSRP) threshold), and may be treated as any on-demand SIB s in Rel-15. In other words, the SIB comprises one or more of: an indication of one or more services supported by the cell of the wireless communications network; an indication of one or more types of communications devices supported by the cell of the communications network; and an indication of a minimum link quality requirement of a connection between the cell of the communications network and communications devices which request the temporary services from the wireless communications network.

Interested UEs can send a SIB request via RACH to trigger the broadcast of this specific SIB. In other words, the uplink signal forms part of a random access, RACH, procedure initiated by the communications device.

As another option, a reserved preamble can be used to indicate to the network that the SI request is for a temporary network SIB, if there is any such SIB. In other words, the uplink signal is a reserved preamble, the reserved preamble being associated with a request for the temporary services.

In some arrangements of embodiments of the present technique, a request can be included in the RRC connection setup message with a specific establishment cause. In other words, the communications device is configured to transmit an uplink signal to the cell of the wireless communications network, the uplink signal comprising a request that the wireless communications network provide temporary services to the communications device, wherein the uplink signal is an RRC connection request message.

Here, the network can then send an RRC setup reject message if it doesn't support the temporary network or can send an RRC setup message with additional information, e.g. what services/UE types it supports, and when the service is going to be initiated. The UE then has the opportunity to go into a dormant (e.g. RRC_IDLE or RRC_INACTIVE) state if it is only interested in one specific service, and wake up at a time at which that service becomes available according to the schedule. In other words, the communications device is configured to receive, in response to transmitting the uplink signal, an RRC setup reject message indicating that the wireless communications network is not a temporary network and so cannot provide the temporary services to the communications device, or alternatively, the communications device is configured to receive, in response to transmitting the uplink signal, an RRC setup message indicating that the wireless communications network is a temporary network and so can provide the temporary services to the communications device.

In some arrangements of embodiments of the present technique, for connected UEs, dedicated RRC signalling can be used to request the temporary network configurations. In other words, the communications device is configured to transmit an uplink signal to the cell of the wireless communications network, the uplink signal comprising a request that the wireless communications network provide temporary services to the communications device, wherein the uplink signal is a dedicated signal for requesting the temporary services, and wherein the uplink signal is transmitted by the communications device while the communications device is in a Radio Resource Control, RRC, connected state with the wireless communications network. Here, as a reply from the network, further temporary network specific configurations in addition to supported services/UE types and schedules, such as specific bandwidth parts (BWP), configured grants, scheduling request (SR) configurations, etc. may be included.

In some arrangements of embodiments of the present technique, paging to notify the UEs of the temporary network/service may be provided. In other words, the downlink signal is a paging message, the paging message indicating that the cell of the wireless communications network can provide temporary services to the communications device. Paging messages can be used to provide the notification to UEs that a temporary network/service is going to be provided, either in advance of the temporary service being provided or as the temporary service is starting. A specific indicator can be included in the paging message (or can be signalling in a dedicated manner to UEs, for example via DCI). The corresponding specific information may be included in the SIB, and interested UEs can decide to access those services or not afterwards. For a temporary network, unlike existing Multimedia Broadcast Multicast Services (MBMS) or conventional networks, it is important to notify the UE that the service has been initiated or is going to be initiated (e.g. a retailer starts a sale); paging is one of the options to send such a notification.

Flow Diagram Representation

FIG. 6 shows a flow diagram illustrating a method of operating a communications device in a wireless communications network. The method begins in step S1. The method comprises, in step S2, determining that the communications device is within a coverage area of a cell of a wireless communications network. In step S3, the method comprises receiving a downlink signal from the cell of the wireless communications network, the downlink signal indicating whether or not the communications device can connect to the cell in order to transmit signals to and/or receive signals from the wireless communications network. The process then comprises, in step S4, detecting, based on the downlink signal, whether or not the wireless communications network is an on-demand network and/or a temporary network. The process ends in step S5.

Those skilled in the art would appreciate that the example method shown by FIG. 6 and example system shown in FIG. 5 may be adapted in accordance with embodiments of the present technique. For example, other intermediate steps may be included in such methods or systems, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A communications device comprising
transceiver circuitry configured to transmit signals to and/or to receive signals from wireless communications networks, and
controller circuitry configured in combination with the transceiver circuitry
to determine that the communications device is within a coverage area of a cell of a wireless communications network,
to receive a downlink signal from the cell of the wireless communications network, the downlink signal indicating whether or not the communications device can connect to the cell in order to transmit signals to and/or receive signals from the wireless communications network, and
to detect, based on the downlink signal, whether or not the wireless communications network is an on-demand network and/or a temporary network.

Paragraph 2. A communications device according to Paragraph 1, wherein the wireless communications network is an on-demand network.

Paragraph 3. A communications device according to Paragraph 2, wherein the downlink signal is a Master Information Block, MIB, comprising system information relating to the wireless communications network, the MIB comprising an indicator which indicates that the wireless communications network is an on-demand network.

Paragraph 4. A communications device according to Paragraph 3, wherein the MIB comprises an indicator of whether or not access to the cell is barred to communications devices which are unable to receive services from on-demand networks or temporary networks.

Paragraph 5. A communications device according to any of Paragraphs 2 to 4, wherein the controller circuitry configured is in combination with the transceiver circuitry
- to transmit an uplink signal to the cell of the wireless communications network, the uplink signal comprising a request that the wireless communications network provide on-demand services to the communications device,
- wherein the downlink signal is a System Information Block, SIB, transmitted by the cell of the wireless communications network in response to the uplink signal and comprising system information relating to the wireless communications network, the SIB comprising information indicating that the wireless communications network is an on-demand network.

Paragraph 6. A communications device according to Paragraph 5, wherein the uplink signal forms part of a random access, RACH, procedure initiated by the communications device.

Paragraph 7. A communications device according to Paragraph 5 or Paragraph 6, wherein the uplink signal is a reserved preamble, the reserved preamble being associated with a request for the on-demand services.

Paragraph 8. A communications device according to any of Paragraphs 5 to 7, wherein the uplink signal is a dedicated signal for requesting the on-demand services, and wherein the uplink signal is transmitted by the communications device while the communications device is in a Radio Resource Control, RRC, connected state with the cell of the wireless communications network.

Paragraph 9. A communications device according to Paragraph 8, wherein the SIB comprises an indication of the availability of the on-demand services and/or a plurality of network slice identifiers each identifying a different network slice of the cell of the wireless communications network, and wherein the communications device is in the RRC connected state with the cell of the wireless communications network through a different one of the network slices to a network slice used by the cell of the wireless communications network for providing the on-demand services.

Paragraph 10. A communications device according to any of Paragraphs 5 to 9, wherein the SIB comprises an indicator of whether or not access to the cell is barred to communications devices which are unable to receive services from on-demand networks or temporary networks.

Paragraph 11. A communications device according to any of Paragraphs 5 to 10, wherein the SIB comprises an indication of one or more services supported by the cell of the wireless communications network and/or an indication of one or more types of communications devices supported by the cell of the communications network.

Paragraph 12. A communications device according to any of Paragraphs 1 to 11, wherein the wireless communications network is a temporary network.

Paragraph 13. A communications device according to Paragraph 12, wherein the controller circuitry configured is in combination with the transceiver circuitry
- to transmit an uplink signal to the cell of the wireless communications network, the uplink signal comprising a request that the wireless communications network provide temporary services to the communications device,
- wherein the downlink signal is a System Information Block, SIB, transmitted by the cell of the wireless communications network in response to the uplink signal and comprising system information relating to the wireless communications network, the SIB comprising information indicating that the wireless communications network is a temporary network.

Paragraph 14. A communications device according to Paragraph 13, wherein the uplink signal forms part of a random access, RACH, procedure initiated by the communications device.

Paragraph 15. A communications device according to Paragraph 13 or Paragraph 14, wherein the uplink signal is a reserved preamble, the reserved preamble being associated with a request for the temporary services.

Paragraph 16. A communications device according to any of Paragraphs 13 to 15, wherein the SIB comprises one or more of:
- an indication of one or more services supported by the cell of the wireless communications network;
- an indication of one or more types of communications devices supported by the cell of the communications network; and
- an indication of a minimum link quality requirement of a connection between the cell of the communications network and communications devices which request the temporary services from the wireless communications network.

Paragraph 17. A communications device according to any of Paragraphs 12 to 16, wherein the downlink signal is a paging message, the paging message indicating that the cell of the wireless communications network can provide temporary services to the communications device.

Paragraph 18. A communications device according to any of Paragraphs 1 to 17, wherein the controller circuitry configured is in combination with the transceiver circuitry
- to transmit an uplink signal to the cell of the wireless communications network, the uplink signal comprising a request that the wireless communications network provide on-demand services or temporary services to the communications device.

Paragraph 19. A communications device according to Paragraph 18, wherein the uplink signal is an RRC connection request message.

Paragraph 20. A communications device according to Paragraph 19, wherein the controller circuitry configured is in combination with the transceiver circuitry
- to receive, in response to transmitting the uplink signal, an RRC setup reject message indicating that the wireless communications network is not an on-demand network and so cannot provide the on-demand services to the communications device.

Paragraph 21. A communications device according to Paragraph 19 or Paragraph 20, wherein the controller circuitry configured is in combination with the transceiver circuitry
- to receive, in response to transmitting the uplink signal, an RRC setup reject message indicating that the wireless communications network is not a temporary network and so cannot provide the temporary services to the communications device.

Paragraph 22. A communications device according to any of Paragraph 19 to 21, wherein the controller circuitry configured is in combination with the transceiver circuitry
- to receive, in response to transmitting the uplink signal, an RRC setup message indicating that the wireless communications network is an on-demand network and so can provide the on-demand services to the communications device.

Paragraph 23. A communications device according to any of Paragraphs 19 to 22, wherein the controller circuitry configured is in combination with the transceiver circuitry
to receive, in response to transmitting the uplink signal, an RRC setup message indicating that the wireless communications network is a temporary network and so can provide the temporary services to the communications device.

Paragraph 24. A communications device according to any of Paragraphs 18 to 23, wherein the uplink signal is a dedicated signal for requesting the on-demand services or the temporary services, and wherein the uplink signal is transmitted by the communications device while the communications device is in a Radio Resource Control, RRC, connected state with the wireless communications network.

Paragraph 25. A communications device according to any of Paragraphs 1 to 24, wherein the downlink signal indicates whether or not the communications device can connect to the cell in order to transmit signals to and/or receive signals from the wireless communications network based at least in part on a type of the communications device.

Paragraph 26. A communications device according to any of Paragraphs 1 to 25, wherein the downlink signal indicates whether or not the communications device can connect to the cell in order to transmit signals to and/or receive signals from the wireless communications network based at least in part on a specification in accordance with which the communications device operates.

Paragraph 27. A communications device according to any of Paragraphs 1 to 26, wherein the wireless communications network is a public land mobile network, PLMN, which is configured to provide on-demand or temporary services to the communications device regardless of which mobile network operator provides wireless communications services to the communications device.

Paragraph 28. A communications device according to any of Paragraphs 1 to 27, wherein the wireless communications network is a non-public network, NPN which is configured to provide on-demand or temporary services to the communications device regardless of which mobile network operator provides wireless communications services to the communications device.

Paragraph 29. A communications device according to any of Paragraphs 1 to 28, wherein the controller circuitry configured is in combination with the transceiver circuitry to detect whether or not the wireless communications network is one of an on-demand network and a temporary network based on a network identifier included within the downlink signal, wherein the network identifier associated with each of an on-demand network and a temporary network is predefined and known to the communications device.

Paragraph 30. A method of operating a communications device configured to transmit signals to and/or to receive signals from wireless communications networks, the method comprising
determining that the communications device is within a coverage area of a cell of a wireless communications network,
receiving a downlink signal from the cell of the wireless communications network, the downlink signal indicating whether or not the communications device can connect to the cell in order to transmit signals to and/or receive signals from the wireless communications network, and
detecting, based on the downlink signal, whether or not the wireless communications network is an on-demand network and/or a temporary network.

Paragraph 31. Circuitry for a communications device comprising
transceiver circuitry configured to transmit signals to and/or to receive signals from wireless communications networks, and
controller circuitry configured in combination with the transceiver circuitry
to determine that the circuitry is within a coverage area of a cell of a wireless communications network,
to receive a downlink signal from the cell of the wireless communications network, the downlink signal indicating whether or not the circuitry can connect to the cell in order to transmit signals to and/or receive signals from the wireless communications network, and
to detect, based on the downlink signal, whether or not the wireless communications network is an on-demand network and/or a temporary network.

Paragraph 32. An infrastructure equipment forming part of a wireless communications network, the infrastructure equipment comprising
transceiver circuitry configured to transmit signals to and/or to receive signals from communications devices, and
controller circuitry configured in combination with the transceiver circuitry
to determine that one of the communications devices is within a coverage area of a cell of the wireless communications network, the cell being controlled by the infrastructure equipment, and
to transmit a downlink to the one of the communications devices, the downlink signal indicating whether or not the communications device can connect to the cell in order to transmit signals to and/or receive signals from the wireless communications network,
wherein the downlink signal provides an indication of whether or not the wireless communications network is an on-demand network and/or a temporary network.

Paragraph 33. An method of operating an infrastructure equipment forming part of a wireless communications network and configured to transmit signals to and/or to receive signals from communications devices, the method comprising
determining that one of the communications devices is within a coverage area of a cell of the wireless communications network, the cell being controlled by the infrastructure equipment, and
transmitting a downlink to the one of the communications devices, the downlink signal indicating whether or not the communications device can connect to the cell in order to transmit signals to and/or receive signals from the wireless communications network,
wherein the downlink signal provides an indication of whether or not the wireless communications network is an on-demand network and/or a temporary network.

Paragraph 34. Circuitry for an infrastructure equipment forming part of a wireless communications network, the circuitry comprising
transceiver circuitry configured to transmit signals to and/or to receive signals from communications devices, and
controller circuitry configured in combination with the transceiver circuitry
to determine that one of the communications devices is within a coverage area of a cell of the wireless communications network, the cell being controlled by the circuitry, and to transmit a downlink to the one of the communications devices, the downlink signal indicating whether or not the communications device can connect to the cell in order to transmit signals to and/or receive signals from the wireless communications network, wherein the downlink signal provides an indication of whether or not the wireless communications network is an on-demand network and/or a temporary network.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-192330, "New work item: 2-step RACH for NR," ZTE Corporation, 3GPP TSG RAN Meeting #85.
[3] RP-192324, "Revised WID: Support of NR Industrial Internet of Things (IoT)," Nokia, Nokia Shanghai Bell, 3GPP TSG RAN Meeting #85.
[4] RP-191575, "NR-based Access to Unlicensed Spectrum," Qualcomm, Inc., 3GPP TSG RAN Meeting #84.
[5] "Network as a Service—SA1 Rel-18 Proposal—Motivations & Objectives", Qualcomm, Inc.

What is claimed is:

1. A communications device comprising
transceiver circuitry configured to transmit signals to and/or to receive signals from wireless communications networks, and
controller circuitry configured in combination with the transceiver circuitry
to determine that the communications device is within a coverage area of a cell of a wireless communications network,
to receive a downlink signal from the cell of the wireless communications network, the downlink signal indicating whether or not the communications device can connect to the cell in order to transmit signals to and/or receive signals from the wireless communications network, and
to detect, based on the downlink signal, whether or not the wireless communications network is an on-demand network and/or a temporary network.

2. A communications device according to claim 1, wherein the wireless communications network is an on-demand network.

3. A communications device according to claim 2, wherein the downlink signal is a Master Information Block, MIB, comprising system information relating to the wireless communications network, the MIB comprising an indicator which indicates that the wireless communications network is an on-demand network.

4. A communications device according to claim 3, wherein the MIB comprises an indicator of whether or not access to the cell is barred to communications devices which are unable to receive services from on-demand networks or temporary networks.

5. A communications device according to claim 2, wherein the controller circuitry configured is in combination with the transceiver circuitry
to transmit an uplink signal to the cell of the wireless communications network, the uplink signal comprising a request that the wireless communications network provide on-demand services to the communications device,
wherein the downlink signal is a System Information Block, SIB, transmitted by the cell of the wireless communications network in response to the uplink signal and comprising system information relating to the wireless communications network, the SIB comprising information indicating that the wireless communications network is an on-demand network.

6. A communications device according to claim 5, wherein the uplink signal forms part of a random access, RACH, procedure initiated by the communications device.

7. A communications device according to claim 5, wherein the uplink signal is a reserved preamble, the reserved preamble being associated with a request for the on-demand services.

8. A communications device according to claim 5, wherein the uplink signal is a dedicated signal for requesting the on-demand services, and wherein the uplink signal is transmitted by the communications device while the communications device is in a Radio Resource Control, RRC, connected state with the cell of the wireless communications network.

9. A communications device according to claim 8, wherein the SIB comprises an indication of the availability of the on-demand services and/or a plurality of network slice identifiers each identifying a different network slice of the cell of the wireless communications network, and wherein the communications device is in the RRC connected state with the cell of the wireless communications network through a different one of the network slices to a network slice used by the cell of the wireless communications network for providing the on-demand services.

10. A communications device according to claim 5, wherein the SIB comprises an indicator of whether or not access to the cell is barred to communications devices which are unable to receive services from on-demand networks or temporary networks.

11. A communications device according to claim 5, wherein the SIB comprises an indication of one or more services supported by the cell of the wireless communications network and/or an indication of one or more types of communications devices supported by the cell of the communications network.

12. A communications device according to claim 1, wherein the wireless communications network is a temporary network.

13. A communications device according to claim 12, wherein the controller circuitry configured is in combination with the transceiver circuitry
to transmit an uplink signal to the cell of the wireless communications network, the uplink signal comprising a request that the wireless communications network provide temporary services to the communications device,
wherein the downlink signal is a System Information Block, SIB, transmitted by the cell of the wireless communications network in response to the uplink signal and comprising system information relating to the wireless communications network, the SIB comprising information indicating that the wireless communications network is a temporary network.

14. A communications device according to claim 13, wherein the uplink signal forms part of a random access, RACH, procedure initiated by the communications device.

15. A communications device according to claim 13, wherein the uplink signal is a reserved preamble, the reserved preamble being associated with a request for the temporary services.

16. A communications device according to claim 13, wherein the SIB comprises one or more of:
an indication of one or more services supported by the cell of the wireless communications network;
an indication of one or more types of communications devices supported by the cell of the communications network; and
an indication of a minimum link quality requirement of a connection between the cell of the communications network and communications devices which request the temporary services from the wireless communications network.

17. A communications device according to claim 12, wherein the downlink signal is a paging message, the paging message indicating that the cell of the wireless communications network can provide temporary services to the communications device.

18. A communications device according to claim 1, wherein the controller circuitry configured is in combination with the transceiver circuitry
to transmit an uplink signal to the cell of the wireless communications network, the uplink signal comprising a request that the wireless communications network provide on-demand services or temporary services to the communications device.

19. An infrastructure equipment forming part of a wireless communications network, the infrastructure equipment comprising
transceiver circuitry configured to transmit signals to and/or to receive signals from communications devices, and
controller circuitry configured in combination with the transceiver circuitry
to determine that one of the communications devices is within a coverage area of a cell of the wireless communications network, the cell being controlled by the infrastructure equipment, and
to transmit a downlink to the one of the communications devices, the downlink signal indicating whether or not the communications device can connect to the cell in order to transmit signals to and/or receive signals from the wireless communications network,
wherein the downlink signal provides an indication of whether or not the wireless communications network is an on-demand network and/or a temporary network.

20. An method of operating an infrastructure equipment forming part of a wireless communications network and configured to transmit signals to and/or to receive signals from communications devices, the method comprising
determining that one of the communications devices is within a coverage area of a cell of the wireless communications network, the cell being controlled by the infrastructure equipment, and
transmitting a downlink to the one of the communications devices, the downlink signal indicating whether or not the communications device can connect to the cell in order to transmit signals to and/or receive signals from the wireless communications network,
wherein the downlink signal provides an indication of whether or not the wireless communications network is an on-demand network and/or a temporary network.

\* \* \* \* \*